Figure 1:
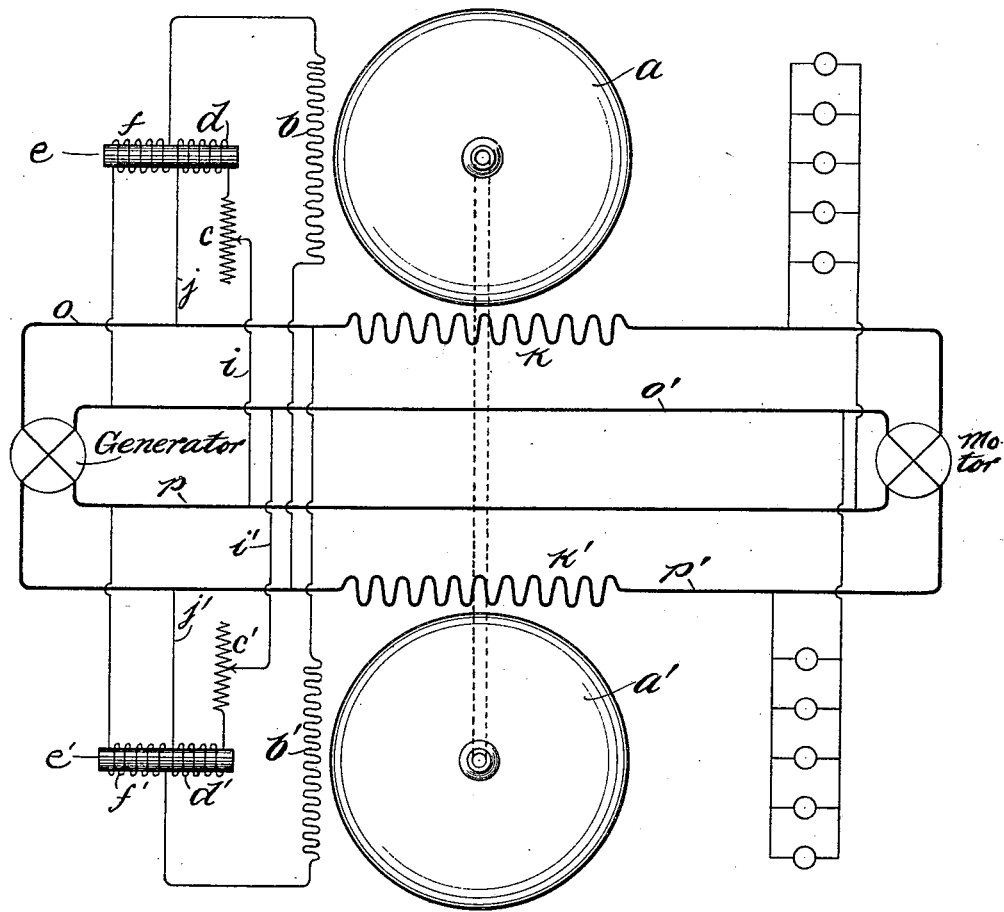

No. 698,660. Patented Apr. 29, 1902.
T. DUNCAN.
POLYPHASE MOTOR METER.
(Application filed Sept. 23, 1899. Renewed Dec. 16, 1901.)

(No Model.) 2 Sheets—Sheet 1.

Witnesses
Samuel R. Bachtel.

Inventor:
Thomas Duncan
By his Attorneys
Charles A. Brown & Cragg

No. 698,660. Patented Apr. 29, 1902.
T. DUNCAN.
POLYPHASE MOTOR METER.
(Application filed Sept. 23, 1899. Renewed Dec. 16, 1901.)
(No Model.) 2 Sheets—Sheet 2.
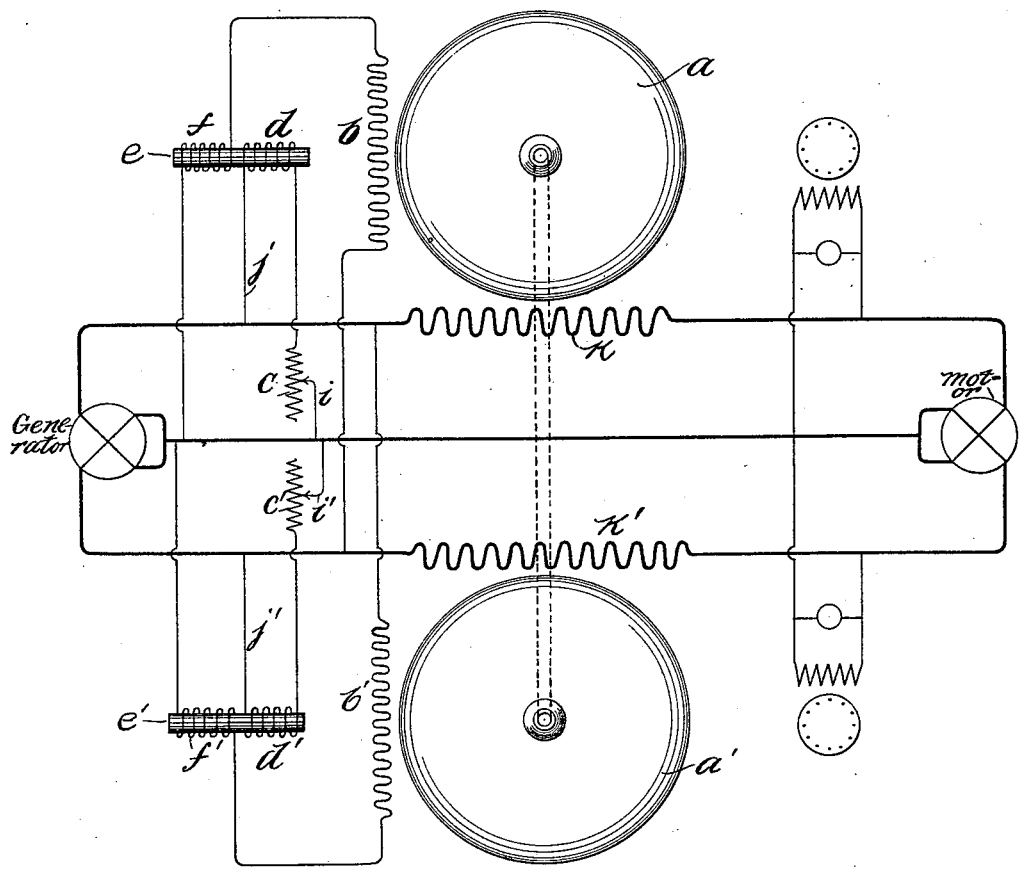
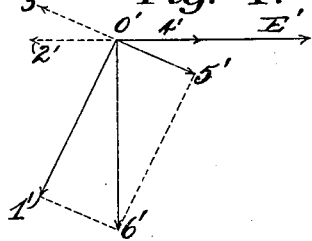
Witnesses
Samuel R. Bachtel
Inventor:
Thomas Duncan
By his Attorneys
Charles A. Brown & Cragg

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

POLYPHASE MOTOR-METER.

SPECIFICATION forming part of Letters Patent No. 698,660, dated April 29, 1902.

Application filed September 23, 1899. Renewed December 16, 1901. Serial No. 86,053. (No model.)

*To all whom it may concern:*

Be it known that I, THOMAS DUNCAN, a citizen of the United States, residing at Chicago, in the county of Cook and State of Illinois, have invented a certain new and useful Improvement in Polyphase Motor-Meters, (Case No. 5,) of which the following is a full, clear, concise, and exact description, reference being had to the accompanying drawings, forming a part of this specification.

My invention relates to polyphase-current motor-meters, and has for its its object an improvement in means for securing the required phase relation between the magnetism of the pressure-windings with respect to the impressed electromotive force of the circuits.

My invention in its preferred embodiment is particularly adapted for use in connection with induction motor-meters.

My present invention consists of novel arrangements of circuits and apparatus for accomplishing the purposes and objects set forth in my application Serial No. 728,692 and is applicable to a plurality of alternating-current circuits.

By means of this invention I am able to measure the true energy of the circuits with which the apparatus is connected with the highest degree of accuracy.

I show my invention herein in its application to diphase circuits; but the invention is broadly applicable to polyphase-current circuits.

In the arrangement shown in the present invention I connect the pressure-winding, which is in inductive relation to the armature, in a circuit different from that which includes the current-winding and which preferably has a lag of ninety degrees. I increase this lag not only by the self-induction due to the pressure-winding itself, but by self-induction due to an impedance-coil, so that the direct lag in the shunt-circuit is considerably in excess of ninety degrees. Upon the core of the impedance-coil, already referred to, I wind a coil connected in a bridge of the circuit including the series field-coil, and in series with said coil in said shunt-circuit I include an adjustable non-inductive resistance. This second impedance-coil generates a secondary electromotive force in the first impedance-coil, and due to the fact that the convolutions of the second impedance-coil are connected reversely this secondary electromotive force is the opposite direction to the primary electromotive force of the circuit, including the shunt field-winding. By a proper adjustment of impedance and resistance of the secondary shunt-circuit I am able to bring the current and magnetism of the shunt field-coil in quadrature with the impressed electromotive force of the circuit including the series coil.

I will explain my invention by reference to the accompanying diagrammatic drawings, in which—

Figure 2:
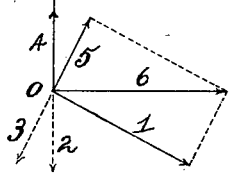

Figure 1 shows my invention applied to the four-wire diphase system of distribution and operating an inductive and non-inductive load. Fig. 2 is a phase and vector diagram showing the relations of the current of the system of Fig. 2. Fig. 3 represents my invention in its application to the three-wire diphase system—that is, a system in which two wires are combined to constitute a single return-circuit. Fig. 4 is a phase and vector diagram showing the relations of currents and phase in the other half of the cycle from that shown in Fig. 2.

Similar characters of reference indicate similar parts in the different figures.

In explaining my invention it will be understood that I am assuming there is no lag of current phase in the main circuit—that is, a non-inductive load is assumed; but the conditions which it is necessary to meet are those in which both an inductive load and a non-inductive load are to be operated.

It is well understood by those skilled in the art that the phase of the magnetism which coincides with the current in the pressure-winding, which is in inductive relation with the armature of the induction motor-meter, must lag behind the impressed electromotive force of the circuit including the current-winding, which also is in inductive relation with the armature, ninety degrees and must be maintained at this angle of lag for varying conditions of operation.

The diagrammatic representation of the circuits and windings of the meter of my invention by which I accomplish the foregoing result will be understood readily from the following description. I describe the meter by reference to the upper half of Fig. 1. It will be understood that the armatures are coupled together, as shown by dotted lines, and the same description which applies to the upper half of Fig. 1 will equally apply to the lower half, the letters in the two parts of the figure being the same, the letters of reference of the lower half being provided for the purpose of distinction with exponents.

The series or current winding $k$ is connected in the circuit $o\,p$ and is located in inductive relation with the armature $a$ in a well-known way. The pressure-winding $b$, also located in inductive relation to the said armature $a$, is connected in a shunt between the leads $o'\,p'$, which carry a current lagging in phase ninety degrees behind that of $o\,p$.

As is well understood, the pressure field-winding must be traversed by a current and set up thereby a magnetic field that is in quadrature with the electromotive force of the circuit $o\,p$, thereby enabling the torque to vary directly as the true watts in the circuit. The pressure-winding is connected with a circuit whose current is ninety degrees behind the electromotive force of the circuit $o\,p$, and this lag will be further increased by the self-induction of the winding $b$.

To secure and maintain the required lag of ninety degrees in the magnetism of coil $b$, I provide the following means: The impedance-coil $f$ is connected in circuit with the winding $b$ and serves to still further increase the lag of the current in that circuit. The circuit $i\,j$ includes the impedance-coil $d$, which is wound upon core $e$. The current of this circuit $i\,j$ is derived from the circuit $o\,p$ and flows through the impedance-coil in a direction opposite to that of the current in the impedance-coil $f$. Included in the circuit $i\,j$ is the adjustable non-inductive resistance $c$, which serves to change the magnitude of the current flowing in said circuit. The current in the impedance-coil $d$ being opposite in direction and displaced approximately ninety degrees to the phase of the current flowing through the pressure-winding $b$ will produce a secondary counter electromotive force in the pressure-winding circuit by means of the impedance-coil, which may be adjusted so as to cause a resultant current in the pressure field-winding exactly ninety degrees from the impressed electromotive force of the circuit including the current field-winding $k$. This result is clearly shown in the vector diagrams in Figs. 2 and 4, Fig. 4 representing the second half of the cycle, exponents being supplied to the reference characters thereof to distinguish them from Fig. 2, in which the line $o\,E$ represents the impressed or line electromotive force, the line $o'$ the current which would flow in pressure-winding $b$ due to the lag of phase in generation plus the self-induction of the impedance-coil $f$ and the winding $b$. The circuit $i\,j$ being connected in a reverse direction relatively to the coil $b$, the electromotive force impressed thereon would not be of the same relative direction to the electromotive force of the circuit $o\,p$ as the impressed pressure $o\,E$, but would lie in the same line therewith. This electromotive force is represented by the line $o^2$, and the current traversing the circuits $i\,j\,i'\,j'$ would be represented by the line $o^3$, the difference in phase between the lines $o^3$ and $o^2$ being occasioned by the impedance-coils $d\,d'$ inclosing the cores $e\,e'$. As the mutual induction of the coil $d$ upon the coil $f$ would be in an opposite direction—that is, the induced electromotive force in the coil $f$ occasioned by the coil $d$ would be opposed to the electromotive force impressed on the circuit $i\,j$ the induced electromotive force in the circuit $f\,b$ would have the direction $o^4$, being displaced one hundred and eighty degrees from the pressure $o^2$, and the current induced in the circuit $f$ would have practically the direction $o^5$. By geometrically adding the currents $o^5$ induced in the circuit $f\,b$ by the coil $d$ and the current $o'$ passing therethrough due to the impressed electromotive force of the circuit $o'\,p'$ the resultant current $o^6$ through the circuit $f\,b$ is obtained, which is in quadrature with the impressed pressure $o\,E$ of the circuit $o\,p$ and will be in phase with the current through the series coil $k$ when there is no inductance in the circuit. From this it will be apparent that completing the parallelogram I get the resultant $o^6$ as the line representing the phase of the current and magnetism of the pressure-winding $b$. This shows that the magnetic effect of this pressure-winding is in quadrature with the impressed electromotive force of the circuit, including the current field-winding.

In Fig. 3 I have shown my invention as applied to three-wire two-phase systems, the arrangement of the meter-circuits being the same as in Fig. 1.

I do not wish to be limited to the precise instrumentality shown for adjusting the phase relation of the circuit, including the pressure field-winding. Modifications may be made which are, nevertheless, within the spirit of my invention. I have not considered it necessary to show the registering-train and retarding device, one of each of which may be connected with the multiple armature of my invention in a manner which is well known.

Having thus described my invention, what I claim as new, and desire to secure by Letters Patent, is—

1. In a device of the class described, the combination with two or more armatures coupled together, of a current and a pressure winding in inductive relation with each of said armatures, said pressure-winding being connected with a circuit different from that including said series winding, an impedance-coil in circuit with said pressure-winding, and means for securing and maintaining a lag of ninety degrees between the magnetism of said pressure-winding and the impressed electromotive force of the circuit including the current-winding, substantially as described.

2. In a device of the class described, the combination with two or more armatures coupled together, of a current and a pressure winding in inductive relation with each of said armatures, said pressure-winding being connected with a circuit carrying a current lagging in phase ninety degrees behind the electromotive force of the circuit including the series winding, an impedance-coil in circuit with said pressure-winding, and means for securing and maintaining a lag of ninety degrees between the magnetism of said pressure-winding and the electromotive force of the circuit including the current-winding, substantially as described.

3. In a polyphase-current induction motor-meter, the combination with two or more armatures coupled together, of a current and a pressure winding in inductive relation with each of said armatures, said pressure-winding being connected with a circuit different from that including the current-winding, and means for producing a counter electromotive force in the circuit including said pressure-winding whereby the magnetic effect of said winding is maintained in quadrature with the impressed electromotive force of the circuit including said current-winding, substantially as described.

4. In a polyphase induction motor-meter, the combination with two or more armatures coupled together, of a current and a pressure winding in induction with each of said armatures, said pressure-winding being connected with a circuit different from that including the current-winding, an impedance-coil in circuit with said pressure-winding, an auxiliary circuit in shunt with said current-winding and adapted to produce a counter electromotive force in the circuit of said pressure-winding; a winding on the core of said impedance-coil and included in said auxiliary circuit and means for adjusting the phase of said auxiliary circuit, whereby the magnetic effect of said pressure-winding is maintained in quadrature with the impressed electromotive force of the circuit including said current-coil, substantially as described.

5. In a device of the class described, the combination with two or more armatures coupled together, of a current and a pressure winding in inductive relation with each of said armatures, said pressure-winding being connected with a circuit different from that including said series winding, an impedance-coil in circuit with said pressure-winding, and means for securing and maintaining a displacement of ninety degrees between the magnetism of said pressure-winding and the impressed electromotive force of the circuit including the current-winding, substantially as described.

6. In a polyphase-current meter, the combination with two sets of meter-windings each including current and pressure windings, the pressure-winding of each set receiving current from the circuit supplying the current-winding of the other set, and two interacting impedance-windings associated with each pressure-winding, one receiving current from the system of distribution, and the other electrically associated with its pressure-winding, the latter pressure-winding also receiving current independently of the interacting impedance-windings, substantially as described.

7. In a polyphase-current meter, the combination with two sets of motor-windings each including current and pressure windings the pressure-winding of each member receiving current from a different circuit than that including its associated current-winding, and two interacting impedance-windings associated with each pressure-winding, one receiving current from the circuit including the associated current-winding and the other in series with its associated pressure-winding, substantially as described.

8. In a polyphase motor, the combination with current and pressure windings, and interacting impedance-windings receiving current independently of each other from different circuits one being electrically associated with the pressure-winding, substantially as described.

9. In a polyphase motor, the combination with current and pressure windings, and interacting impedance-windings receiving current independently of each other from different circuits one being included in series with the pressure-winding, substantially as described.

In witness whereof I hereunto subscribe my name this 13th day of September, A. D. 1899.

THOMAS DUNCAN.

Witnesses:
CHARLES A. BROWN,
GEORGE L. CRAGG.